United States Patent
Schaap

(10) Patent No.: US 11,595,366 B2
(45) Date of Patent: Feb. 28, 2023

(54) SECURE COMMUNICATION OF NETWORK TRAFFIC

(71) Applicant: Apple Inc., Cupertino, CA (US)

(72) Inventor: Tristan F. Schaap, San Francisco, CA (US)

( * ) Notice: Subject to any disclaimer, the term of this patent is extended or adjusted under 35 U.S.C. 154(b) by 563 days.

(21) Appl. No.: 16/329,714

(22) PCT Filed: Sep. 8, 2017

(86) PCT No.: PCT/US2017/050814
§ 371 (c)(1),
(2) Date: Feb. 28, 2019

(87) PCT Pub. No.: WO2018/057321
PCT Pub. Date: Mar. 29, 2018

(65) Prior Publication Data
US 2019/0207915 A1     Jul. 4, 2019

Related U.S. Application Data

(60) Provisional application No. 62/399,307, filed on Sep. 23, 2016.

(51) Int. Cl.
*H04L 9/40* (2022.01)
*H04L 9/08* (2006.01)
*H04L 9/32* (2006.01)

(52) U.S. Cl.
CPC ........ *H04L 63/0442* (2013.01); *H04L 9/0877* (2013.01); *H04L 9/0891* (2013.01);
(Continued)

(58) Field of Classification Search
CPC ................................................ H04L 63/0442
See application file for complete search history.

(56) References Cited

U.S. PATENT DOCUMENTS

2009/0129586 A1   5/2009   Miyazaki et al.
2012/0131354 A1   5/2012   French
(Continued)

FOREIGN PATENT DOCUMENTS

CN      105163285 A      12/2015
CN      105187376 A      12/2015
(Continued)

OTHER PUBLICATIONS

International Search Report and Written Opinion in Appl. No. PCT/US2017/050814 dated Mar. 20, 2018, 22 pages.
(Continued)

*Primary Examiner* — Simon P Kanaan
(74) *Attorney, Agent, or Firm* — Kowert, Hood, Munyon, Rankin & Goetzel, P.C.; Scott W. Pape; Dean M. Munyon

(57) ABSTRACT

Techniques are disclosed relating to securely communicating traffic. In some embodiments, an apparatus includes a secure circuit storing keys usable to encrypt data communications between devices over a network. The secure circuit is configured to store information that defines a set of usage criteria for the keys. The set of usage criteria specifies that a first key is dedicated to encrypting data being communicated from a first device to a second device. The secure circuit is configured to receive a request to encrypt a portion of a message with the first key, the request indicating that the message is being sent from the first device to the second device, and to encrypt the portion of the message with the first key in response to determining that the set of usage criteria permits encryption with the first key for a message being sent from the first device to the second device.

13 Claims, 11 Drawing Sheets

(52) U.S. Cl.
CPC .......... *H04L 9/0897* (2013.01); *H04L 9/3234* (2013.01); *H04L 9/3263* (2013.01); *H04L 63/068* (2013.01); *H04L 63/126* (2013.01); *H04L 2209/127* (2013.01)

(56) References Cited

U.S. PATENT DOCUMENTS

| | | | |
|---|---|---|---|
| 2013/0111582 A1 | 5/2013 | Forest | |
| 2014/0095867 A1* | 4/2014 | Smith | G06F 21/602 |
| | | | 713/164 |
| 2014/0310530 A1 | 10/2014 | Oguma et al. | |
| 2015/0039890 A1 | 2/2015 | Khosravi et al. | |
| 2015/0092942 A1* | 4/2015 | Wager | H04W 12/0433 |
| | | | 380/270 |
| 2015/0270968 A1 | 9/2015 | Nairn et al. | |
| 2016/0149908 A1* | 5/2016 | Unagami | H04L 63/061 |
| | | | 713/170 |
| 2016/0205194 A1 | 7/2016 | Kishikawa et al. | |
| 2016/0315766 A1* | 10/2016 | Ujiie | H04L 63/0428 |
| 2017/0134164 A1* | 5/2017 | Haga | G06F 21/572 |
| 2017/0180397 A1* | 6/2017 | Sikand | G07C 5/008 |
| 2018/0083785 A1* | 3/2018 | Shields | H04L 9/12 |
| 2018/0126954 A1 | 5/2018 | Haga et al. | |
| 2018/0295112 A1* | 10/2018 | Coppola | H04L 9/0833 |
| 2019/0173862 A1* | 6/2019 | Kim | H04L 9/3242 |
| 2019/0207915 A1* | 7/2019 | Schaap | H04L 9/0877 |
| 2019/0268420 A1* | 8/2019 | Acharya | H04L 63/0823 |
| 2021/0028925 A1 | 1/2021 | Ujiie et al. | |

FOREIGN PATENT DOCUMENTS

| | | | |
|---|---|---|---|
| CN | 105392134 A | 3/2016 | |
| GB | 2471282 | 12/2010 | |
| JP | H08204698 A | 8/1996 | |
| JP | 2013-048374 A | 3/2013 | |
| JP | 2015027031 A | 2/2015 | |
| JP | 2015119357 A | 6/2015 | |
| JP | 2016-012917 A | 1/2016 | |
| JP | 2016-163265 A | 9/2016 | |
| KR | 10-2008-0033267 A | 4/2008 | |
| KR | 10-2008-0110940 A | 12/2008 | |
| KR | 10-1508497 B | 4/2015 | |
| KR | 10-2015-0050335 A | 5/2015 | |
| KR | 10-2015-0079880 A | 7/2015 | |
| WO | WO-2006133545 A1 * | 12/2006 | .......... G06F 21/602 |

OTHER PUBLICATIONS

Irina Hossain, "Analysis of Group Key Management Protocols for Secure Multicasting in Vehicular Software Distribution Network," 3rd IEEE International Conference on Wireless and Mobile Computing, Networking and Communications (WiMob 2007), 9 pages.
Wang Chang-Ji, et al., "Using attribute certificate to design Role-based Access Control," IEEE 2003, pp. 216-218.
Office Action in CN Appl. No. 201780058100.1 dated Apr. 27, 2021, 7 pages.
Office Action in KR Appl. No. 10-2019-7006297 dated Apr. 20, 2021, 4 pages.
Office Action in EP Appl. No. 17772527.2 dated Apr. 14, 2021, 8 pages.
Examination Report No. 2 in AU Appl. No. 2017330232 dated May 14, 2020, 6 pages.
Examination Report in AU Appl. No. 2017330232 dated Dec. 23, 2019, 5 pages.
Office Action in KR Appl. No. 10-2019-7006297 dated Jul. 24, 2020, 7 pages.
Issac, Evaluation Technology for Encryption Module Implementation Compatibility, National IT Industry Promotion Agency (Dec. 29, 2003), 120 pages.
Office Action in KR Appl. No. 10-2019-7006297 dated Jan. 6, 2022, 4 pages.
Office Action in Japanese Patent Application No. 2021-055756 dated Jun. 24, 2022, 3 pages.
Notice of Allowance in CN Appl. No. 201780058100.1 dated Jun. 28, 2022, 5 pages.
Han et al., "On Authentication in a Connected Vehicle: Secure Integration of Mobile Devices With Vehicular Networks," IEEE International Conference, ICCPS'13 Apr. 8-11, 2013, pp. 160-169.
Wang Jian et. al, "Radio Certification Systems Applied to CAN Bus", Beijing Post and Telecommunications University Journal No. 04, 20150815, 5 pages.
Examination Report in EP Appl. No. 17772527.2 dated Jun. 3, 2022, 9 pages.

* cited by examiner

SECURE COMMUNICATION OF NETWORK TRAFFIC

BACKGROUND

Technical Field

This disclosure relates generally to computer networks, and, more specifically, to securely communicating traffic over a network.

Description of the Related Art

Security concerns are a common consideration when designing a computer network. In the case of a local area network (LAN), a network design may include a gateway device that couples the internal LAN to an external network such as the Internet. To isolate the LAN, the gateway device may implement a firewall appliance that restricts the flow of incoming and/or outgoing traffic. This appliance, for example, may analyze the source addresses of incoming traffic as well as the source and destination ports before the appliance allows traffic to pass through the firewall. For example, if a malicious entity is attempting to access a network port associated with an unknown type of traffic, the gateway may block the traffic from entering the network.

SUMMARY

The present disclosure describes embodiments in which traffic is securely communicated between devices in a network. In various embodiments, a secure circuit stores keys usable to encrypt data communications between devices over a network. The secure circuit is configured to store information that defines a set of usage criteria for the keys. The set of usage criteria specifies that a first key is dedicated to encrypting data being communicated from a first device to a second device. The secure circuit is configured to receive a request to encrypt a portion of a message with the first key. In such an embodiment, the request indicates that the message is being sent from the first device to the second device. In response to determining that the set of usage criteria permits encryption with the first key for a message being sent from the first device to the second device, the secure circuit is configured to encrypt the portion of the message with the first key. In some embodiments, the secure circuit is coupled to the first device and is configured to encrypt the portion of the message such that the encrypted portion is usable to establish that the message is sent by the first device.

Figure 1:
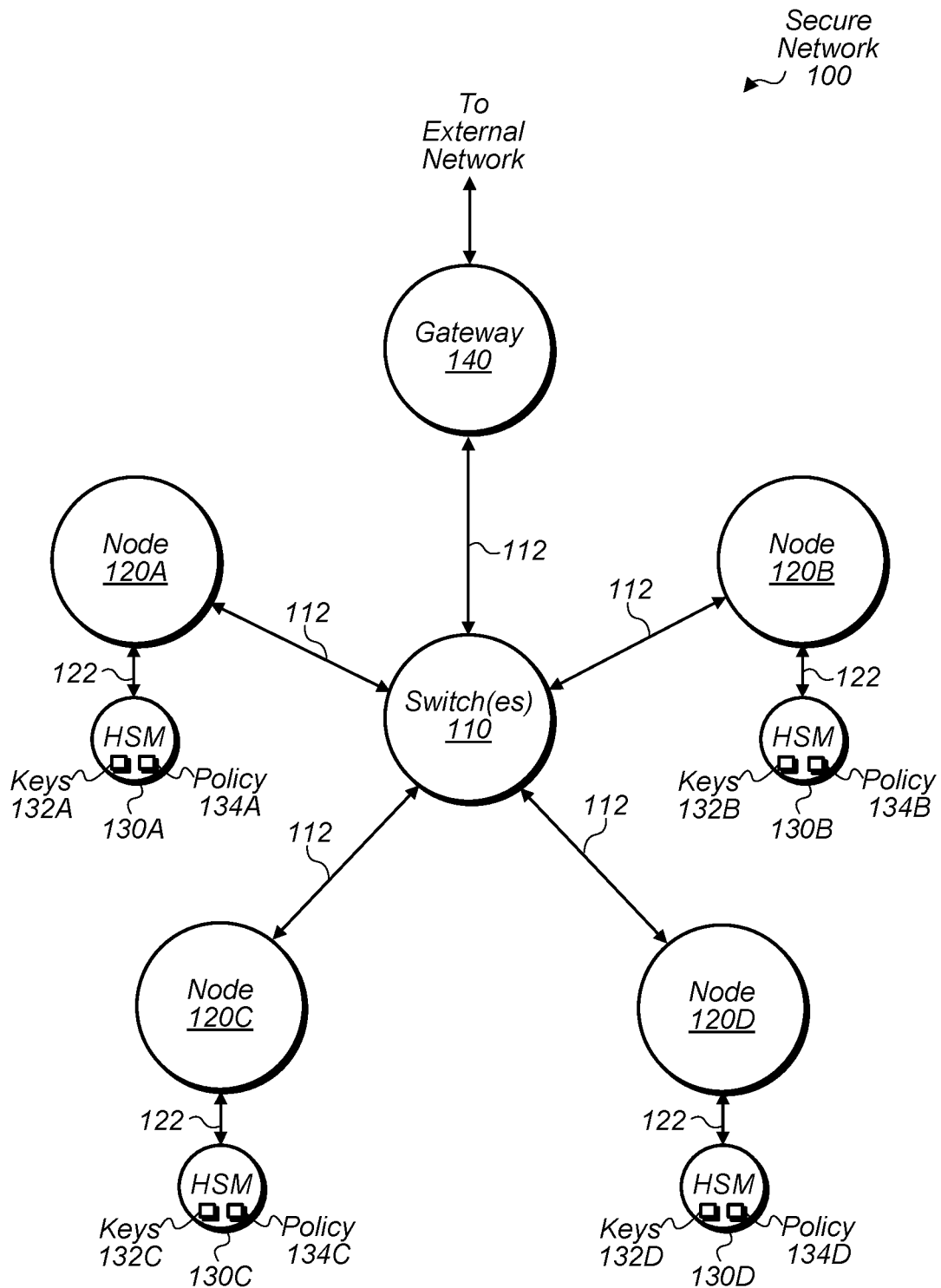
FIG. 1 is a block diagram illustrating an example of a secure network.

This disclosure includes references to "one embodiment" or "an embodiment." The appearances of the phrases "in one embodiment" or "in an embodiment" do not necessarily refer to the same embodiment. Particular features, structures, or characteristics may be combined in any suitable manner consistent with this disclosure.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "network interface configured to facilitate communication over a wide area network" is intended to cover, for example, circuitry that performs this function during operation, even if the computer system in question is not currently being used (e.g., a power supply is not connected to it). Thus, an entity described or recited as "configured to" perform some task refers to something physical, such as a device, circuit, memory storing program instructions executable to implement the task, etc. This phrase is not used herein to refer to something intangible. Thus, the "configured to" construct is not used herein to refer to a software entity such as an application programming interface (API).

The term "configured to" is not intended to mean "configurable to." An unprogrammed FPGA, for example, would not be considered to be "configured to" perform some specific function, although it may be "configurable to" perform that function and may be "configured to" perform the function after programming.

Reciting in the appended claims that a structure is "configured to" perform one or more tasks is expressly intended not to invoke 35 U.S.C. § 112(f) for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

As used herein, the terms "first," "second," etc. are used as labels for nouns that they precede, and do not imply any type of ordering (e.g., spatial, temporal, logical, etc.) unless specifically stated. For example, when a network node conveys a first frame and a second frame, the terms "first" and "second" do not imply that the first frame is sent before sending the second frame. In other words, the "first" and "second" frames may be sent in any suitable order or even in parallel.

As used herein, the term "based on" is used to describe one or more factors that affect a determination. This term does not foreclose the possibility that additional factors may affect a determination. That is, a determination may be solely based on specified factors or based on the specified factors as well as other, unspecified factors. Consider the phrase "determine A based on B." This phrase specifies that B is a factor used to determine A or that affects the determination of A. This phrase does not foreclose that the determination of A may also be based on some other factor, such as C. This phrase is also intended to cover an embodiment in which A is determined based solely on B. As used herein, the phrase "based on" is thus synonymous with the phrase "based at least in part on."

DETAILED DESCRIPTION

While it is important to consider external threats when designing a network, it may also be beneficial to consider internal threats such as an internal network node becoming compromised. For example, in an office environment, an employee may receive an email having a malicious attachment and begin execution of the attachment compromising the employee's computer. Through this breach of security, a malicious actor may be able to gain access not only to that computer but also access to other computers coupled through the office LAN. As another example, it was recently demonstrated that a nefarious actor could gain control over functionality of a vehicle by breaching the navigation unit, which had a cellular connection to the Internet for receiving content. After compromising this unit, the actor could then issue instructions to other control units in the vehicle as no internal network restrictions were imposed.

The present disclosure describes various techniques for securing a network such as a LAN. As will be described below, in various embodiments, multiple nodes in a network are coupled to respective hardware security modules (HSMs) that are configured to encrypt and decrypt a portion of traffic being communicated over the network. In some embodiments, the HSMs are also configured to store policy information that restricts the use of encryption keys based on sources and destinations of traffic. If a node attempts to communicate network traffic to an unauthorized destination, its HSM may decline to encrypt a portion of the traffic based on its policy information. The HSM at the destination may also decline to decrypt any traffic from the source node based on its policy information. By declining to encrypt or decrypt traffic, the HSMs may restrict what communications can occur on the network. In some instances, restricting communications in this manner may reduce the potential exposure of the network in the event that a node becomes compromised. In some instances, it may also be possible to identify when a node is compromised and/or determine when an unauthorized node has been inserted into the network.

Figure 2:
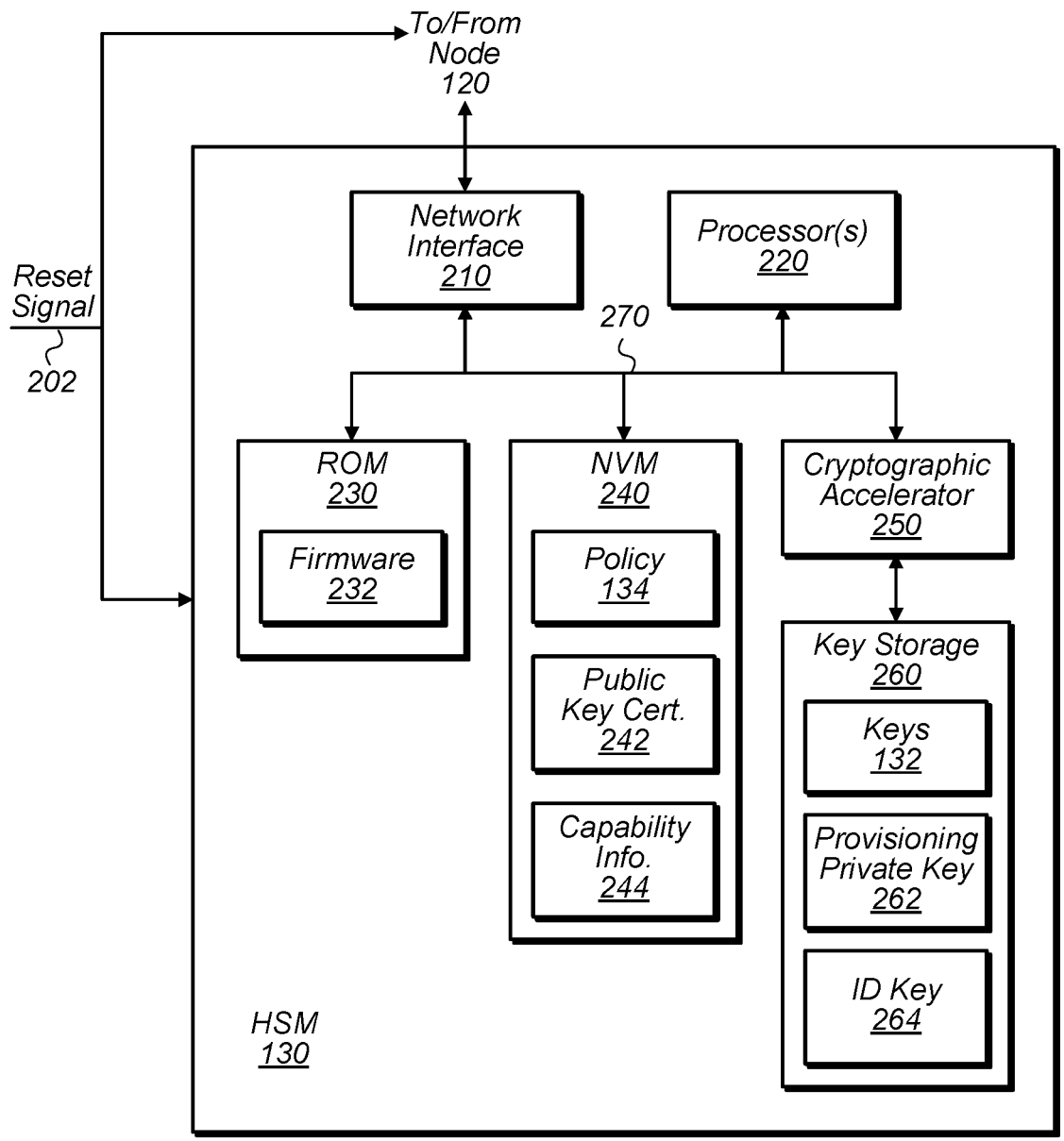
FIG. 2 is a block diagram illustrating an example of a hardware security module in the secure network.

The present disclosure begins with a description of components in a secure network in conjunction with FIGS. 1 and 2. Network communications between nodes are described with respect to FIGS. 3-6. Provisioning of network components is described with respect to FIGS. 7-10C. Lastly, an exemplary computer system that may be used to implement one or more network components is discussed with FIG. 11.

Turning now to FIG. 1, a block diagram of a secure network 100 is depicted. In the illustrated embodiment, network 100 includes a switch 110 coupled to multiple nodes 120A-D via links 112. Nodes 120A-D, in turn, are coupled to respective hardware security modules (HSMs) 130A-D via links 122. Switch 110 is also coupled to a gateway 140 via a link 112. In various embodiments, network 100 may be implemented differently than shown. Accordingly, in some embodiments, more (or less) switches 110 and nodes 120 may be present, redundant links 112 between nodes 120 may also be present, etc.

Secure network 100, in some embodiments, is a local area network (LAN) configured to communicate network traffic among nodes 120. In various embodiments, network traffic is routed among nodes 120 by switches 110. Accordingly, switches 110 may be configured to queue received data frames from nodes 120 and analyze the source and destination addresses specified by the frames in order to appropriately send frames on to their specified destinations. In some embodiments, switches 110 are configured to route frames in accordance with IEEE 802.3 (i.e., Ethernet Frames); however, in other embodiments, other networking protocols may be supported. In the illustrated embodiment, network 100 is coupled to an external network (e.g., the Internet) via a gateway device 140. In some embodiments, gateway 140 is configured to implement a firewall and perform network address translation (NAT) for network 100.

Nodes 120 may correspond to any suitable devices configured to communicate over a network. In some embodiments, nodes 120 may be devices within a home or office network such as desktop and laptop computers, mobile devices, smart television, smart appliances, etc. In some embodiments, nodes 120 are machines within a fabrication plant that are configured to perform various operations. In some embodiments, nodes 120 are electronic control units (ECUs) in a vehicle such as an aircraft, boat, automobile, recreational vehicle, etc. As used herein, the term "electronic control unit (ECU)" is to be interpreted according to its understood meaning in the art, and includes an embedded system (e.g., microcontroller) that controls one or more operations of a vehicle. In such an embodiment, nodes 120, for example, may include a motor ECU that communicates torque-control messages and wheel-speed messages in order to control operation of a motor, a brake-system ECU that communicates brake control messages in order to apply braking, a backup camera ECU that communicates video, a steering ECU that communicates steering-wheel-angle messages to control turning, etc.

In various embodiments, traffic communicated over network 100 may have some predictable characteristics. For example, a given node 120 may communicate traffic with only a subset of other nodes when correctly operating as designed—e.g., node 120A may communicate with nodes 120B and 120C, but not node 120D. As another example, a given node 120 may communicate traffic in only one direction when operating as designed—e.g., node 120B may multicast traffic to nodes 120C and 120D, but nodes 120C and 120D may not communicate any traffic back to node 120B. As will be described below, these predictable characteristics may allow a policy 134 to be defined for a given node 120 in order to ensure that it communicates traffic as designed. If the node 120 attempts to deviate from this policy (e.g., because it has become compromised), secure network 100 may be configured to restrict its ability to do so via HSMs 130.

Hardware security modules (HSMs) 130, in one embodiment, are secure circuits configured to encrypt and decrypt traffic being communicated among nodes 120, by using one or more internally stored keys 132. As used herein, the term "secure circuit" refers to a circuit that protects an isolated, internal resource (e.g., keys 132) from being directly accessed by an external entity (e.g., a node 120). In some embodiments, a given HSM 130 may be responsible for all encryption performed for a given node 120. For example, in sending a set of data frames, node 120A may request that HSM 130A encrypt each frame's payload. In other embodiments, however, a given HSM 130 may be responsible for only a portion of the encrypted data transmitted by a given node 120, which may handle the remaining encryption. In some embodiments, this may be attributable to a slow connection link 122 between a node 120 and an HSM 130. As a result, a given node 120 may perform the bulk of in the encryption in a given frame (e.g., the payload) while an HSM 130 may encrypt a small remaining portion. In various embodiments, HSM 130 is involved in the encryption and decryption of at least some portion because an HSM 130 is potentially more secure than a given node 120 and thus less likely to become compromised. In some embodiments, this added security is attributable to an HSM 130 presenting a limited attack surface and isolating internal components as will be discussed below with FIG. 2.

In various embodiments, HSMs 130 are configured to encrypt and decrypt a portion of a frame that is usable to verify the integrity of the frame and/or authenticate a source node 120 of the frame. In some embodiments, this portion is a message authentication code (MAC) included in a frame being communicated by a node 120. (As used herein, the term "message authentication code" is to be interpreted according to its understood meaning in the art, and includes data usable to authenticate a message and computed via a keyed function.) For example, in some embodiments, nodes 120 are configured to communicate frames in accordance with IEEE 802.1AE (also referred to as Media Access Control Security (MACSec)). In generating a frame, a node 120 may encrypt a frame payload using Advanced Encryption Standard in Galois/Counter Mode (AES-GCM). As part of applying this algorithm, a node 120 generates a value usable to check the integrity of the frame (i.e., an integrity check value (ICV)) and referred to as a Galois message authentication code (GMAC). In such an embodiment, if a given node 120 is the source of a frame, its respective HSM 130 is configured to encrypt the GMAC in the frame with an encryption key 132. When the frame is then communicated to a recipient node 120, the HSM 130 at that node 120 decrypts the GMAC, so that the recipient node 120 can use the decrypted GMAC to verify integrity of the received frame in order to ensure that the frame was not tampered with and is from the correct source. In other embodiments, HSMs 130 may be configured to encrypt and decrypt other portions of a frame; nodes 120 may also communicate using a protocol other than MACsec. For example, in another embodiment, HSMs 130 are configured to encrypt the frame check sequence (FCS) in Ethernet frames. In still another embodiment, HSMs 130 may be configured to encrypt header checksums in Internet Protocol (IP) packets. Accordingly, while various embodiments are presented below within the context of MACs, their descriptions may be applicable to other embodiments in which MACs are not used.

In some embodiments, HSMs 130 are configured to encrypt a portion of a frame (e.g., each MAC) apart from other frames in a stream of traffic as will be described below with respect to FIG. 3. For example, in one embodiment, HSMs 130 are configured to apply AES in Electronic Codebook (ECB) mode to each portion. In other embodiments, for a set of frames, HSMs 130 may be configured to employ block chaining to encrypt multiple portions from multiple frames such that a later encrypted portion is dependent on an earlier portion as will be described below with respect to FIG. 4. For example, in one embodiment, HSMs apply AES in Cipher Block Chaining (CBC) mode to chain multiple portions together. In some instances, using block chaining may reduce the amount of traffic communicated over a link 122 between a node 120 and an HSM 130.

In various embodiments, HSMs 130 are configured to use different keys 132 based on the traffic being communicated by node 120. That is, in some embodiments, each key 132 is associated with a respective node 120 or set of nodes 120. For example, if node 120A is communicating different traffic with nodes 120B and 120C, HSM 130A may use a first key 132A for encrypting traffic corresponding to the communication with node 120B and a second key 132A for encrypting traffic corresponding to communication with node 120C. If, however, node 120A is multicasting the same stream to nodes 120B and 120C, the same key 132A may be used. In some embodiments, each key 132 is applicable to only one direction of traffic. Accordingly, HSM 130A may use a first key for traffic being sent by node 120A to node 120B and a second key for traffic being received by node 120A from node 120B. In order to restrict a given node 120's ability to communicate with other nodes 120, in various embodiments, its HSM 130 is provisioned with only the keys 132 appropriate for its intended communications. Accordingly, if node 120A is intended to communicate with node 120C but not 120D, HSM 130A is given a key 132A for node 120C, but not 120D. Still further, if node 120A is intended to send traffic to node 120C but not receive traffic from node 120C, HSM 130A is given a key 132A for sending traffic but not a key 132A for receiving traffic. Provisioning an HSM 130 in this manner may prevent its corresponding node 120 from communicating in an unauthorized manner. That is, as HSM 130A does not include a key 132A for communicating with node 120D in the example above, node 120A cannot communicate with node 120D even if node 120A becomes compromised.

In the illustrated embodiment, HSMs 130 also include policies 134 to further restrict the use of their keys 132. In various embodiments, a policy 134 of an HSM 130 defines a set of usage criteria for each of the keys 132 included in that HSM 130. These criteria may specify the nodes 120 corresponding to a given key 132—e.g., that a particular key 132A is to be used for communication with only node 120B. In some embodiments, nodes 120 may be identified in the usage criteria based on their network addresses. In various embodiments, these criteria also specify the permissible cryptographic function (i.e., encryption or decryption) for a given key 132—and thus restrict the direction of traffic. For example, policy 134A may specify that a particular key in keys 132A corresponds to node 120B and is usable only for encryption; similarly, policy 134B may specify that the particular key in keys 132B corresponds to node 120A and is usable only for decryption. Thus, the key is usable for sending encrypted traffic from node 120A to node 120B, but not from node 120B to 120A. In some embodiments, a particular criterion for a given key may be expressed as a tuple that includes 1) an indication of whether that key is to be used for encryption or decryption and 2) an indication identifying one or more of nodes 120. In various embodiments, a given HSM 130 may verify that a cryptographic operation requested by a node 120 is in compliance with its policy 134 before performing the requested operation. An example illustrating use of policies 134 is presented below with respect to FIG. 5.

In some embodiments, the provisioning of HSMs 130 is handled by gateway 140. As will be described in greater detail below with respect to FIGS. 7-9, gateway 140 may be configured to facilitate registration of components in network 100 as well as receiving keys 132 and policies 134 from an entity external to network 100. In some embodiments, gateway 140 may facilitate establishing a secure connection with this entity as well as distributing keys 132 and policies 134 to the appropriate nodes 120. In various embodiments, provisioning may be performed during the initial assembly of network 100 and after replacement of components in network 100 as discussed in greater detail below.

Turning now to FIG. 2, a block diagram of an HSM 130 is depicted. In the illustrated embodiment, HSM 130 includes a network interface 210, one or more processors 220, a read only memory (ROM) 230, non-volatile memory (NVM) 240, a cryptographic accelerator 250, and a key storage 260 coupled together via an interconnect 270. ROM 230 includes firmware 232. NVM 240 includes a policy 134, a public key certificate 242, and capability information 244. Key storage 260 includes keys 132, provisioning private key 262, and an identity key 264. In some embodiments, HSM 130 may include more (or less) components than shown.

Network interface 210, in one embodiment, is configured to facilitate communication with a node 120. Accordingly, interface 210 may perform encoding and decoding data across a link 122, which, in some embodiments, is a serial peripheral interface (SPI) bus. In various embodiments, interface 210 is also configured to isolate internal components 220-260 from an external entity such as node 120, by filtering incoming read and write operations. In some embodiments, HSM 130 presents a limited attack surface by supporting only a small number of commands. For example, in one embodiment, HSM 130 supports a first command for requesting the use of a particular key, a second command for requesting encryption with that key 132, a third command for requesting decryption with that key, and a fourth command for updating keys 132. If interface 210 receives data from a node 120 that is not one of the supported commands, interface 210 may prevent the data from entering HSM 130.

Processor 220, in one embodiment, is configured to execute program instructions to implement various operations described herein with respect to HSM 130. In some embodiments, processor 220 is hardwired to fetch from a specific address range at boot in order to boot firmware 232 from ROM 230. Notably, because memory 230 is a ROM (as opposed to some other type of memory that can easily be written to), firmware 232 is resistant to modification, and thus, being tampered with. As a result, HSM 130 can be restored to a default, trusted state by merely causing processor 220 to reboot, which, in the illustrated embodiment, can be initiated by asserting reset signal 202. Thus, processor 220 may further serve to isolate components in HSM 130.

Cryptographic accelerator 250, in one embodiment, is circuitry configured to perform cryptographic operations for HSM 130. Cryptographic accelerator 250 may implement any suitable encryption algorithm such as Data Encryption Standard (DES), Advanced Encryption Standard (AES), Rivest Shamir Adleman (RSA), etc. In some embodiments, accelerator 250 may further implement elliptic curve cryptography (ECC). In the illustrated embodiment, accelerator 250 is configured to use keys stored in key storage 260, which accelerator 250 may isolate from being accessed by other components of HSM 130. That is, in some embodiments, accelerator 250 may allow keys 132 to be updated by processor 220, but not allow keys 132 to be read from storage 260 by processor 220. Still further, when a request is received to use one of keys 132, accelerator 250 may verify that the requested operation is permitted by policy 134. In various embodiments, accelerator 250 is also involved in the provisioning of HSM 130. This may include using provisioning private key 262 to decrypt received keys 132 received from a provisioning server as well as modifying keys 132 so that they are unknown to the server and gateway 140 as discussed in below with respect to FIG. 7.

Provisioning private key 262 and its corresponding public key certificate 242, in the some embodiments, are used to establish a secure connection with a provisioning server. That is, an HSM 130 may present, to the provisioning server, its publicly key certificate 242, which includes the public key corresponding to private key 262. The provisioning server may then encrypt keys 132 and a policy 134 using the public key, so that accelerator 250 can then decrypt the encrypted keys 132 with private key 262. In other embodiments, the certificates may be used to derive ephemeral keys via Elliptic Curve Diffie-Hellman (ECDH). In some embodiments, accelerator 250 may generate the public key pair including private key 262 during an initial provisioning of HSM 130 and register the key pair with the provisioning pair in order to receive certificate 242 as will be discussed below with respect to FIG. 8A. In some embodiments, certificate 242 is an X.509 certificate. In some embodiments, accelerator 250 signs the public key with identity key 264 when submitting a certificate signing request to the provisioning server. In various embodiments, identity key 264 is an encryption key that is unique to an HSM 130 and known to the provisioning server. In some embodiments, identity key 264 is stored in HSM 130 during fabrication of HSM 130.

In some embodiments, HSM 130 also sends capability information 244 when being provisioned with new keys 132 and a policy 134. As will be described with FIG. 8B, in various embodiments, information 244 specifies one or more capabilities of a node 120 to which an HSM 130 is coupled. For example, in an embodiment in which node 120 is a brake module ECU, information 244 may identify node 120 as such. The provisioning server, in turn, may use this information to determine what keys 132 and policy 134 should be provided to that HSM 130. In some embodiments, information 244 may be signed by a provisioning server (and in some embodiments included in certificate 242).

Figure 3:
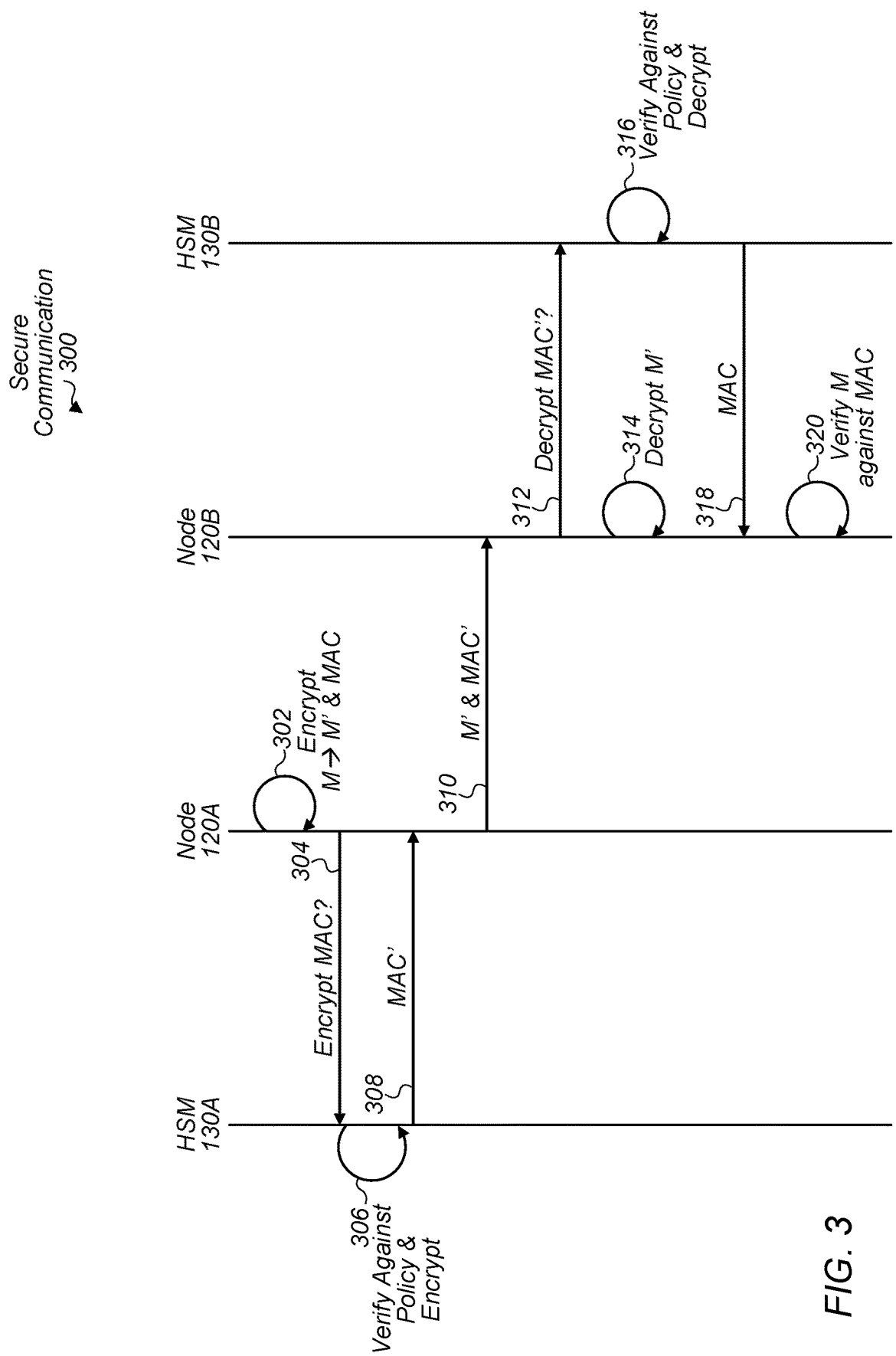
FIG. 3 is a communication diagram illustrating an example of a secure communication between two nodes in the secure network.

Turning now to FIG. 3, a communication diagram of a secure communication 300 is depicted. Secure communication 300 is an example of a secure communication between two nodes 120 communicating over network 100. It is noted that steps 302-318 may be performed in parallel or in a different order than shown in some embodiments.

As shown, communication 300 may begin with at 302 with a node 120A encrypting a message M to produce an encrypted messages M' and a corresponding MAC usable to verify the integrity of the message M and authenticate M as being from node 120A. At 304, node 120A issues a request to its HSM 130A to encrypt the MAC. In various embodiments, node 120A also indicates its intention to send the MAC to node 120B. At 306, HSM 130A verifies that the requested operation is authorized by its policy 134. If the operation is authorized, HSM 130 may select the appropriate key 132 identified in policy 134 and encrypts (via accelerator 250 noted above) the MAC to produce an encrypted MAC', which is sent back to node 120A at 308. If the requested operation is not authorized by HSM 130A's policy 134, HSM 130A may merely respond with an indication that the request has been denied. At 310, node 120A sends M' and MAC' to node 120B for processing.

At 312, node 120B forwards MAC' to HSM 130B for decryption. In various embodiments, node 120B also indicates node 120A as being the source of MAC'. At 314, node 120B begins decryption of M' to reproduce M. Meanwhile, at 316, HSM 130B verifies whether the requested decryption is authorized by its policy 134. If the operation is authorized, HSM 130B selects the appropriate key 132 and decrypts MAC' to reproduce the MAC, which, at 318, is provided to node 120B. If the operation is not authorized by HSM 130B's policy 134, HSM 130B may respond indicating that request has been denied. At 320, node 120B verifies M against the MAC. If the verification fails, this failure may be indicated meaning that M has been tampered with and/or that M is not from node 120A.

Figure 4:
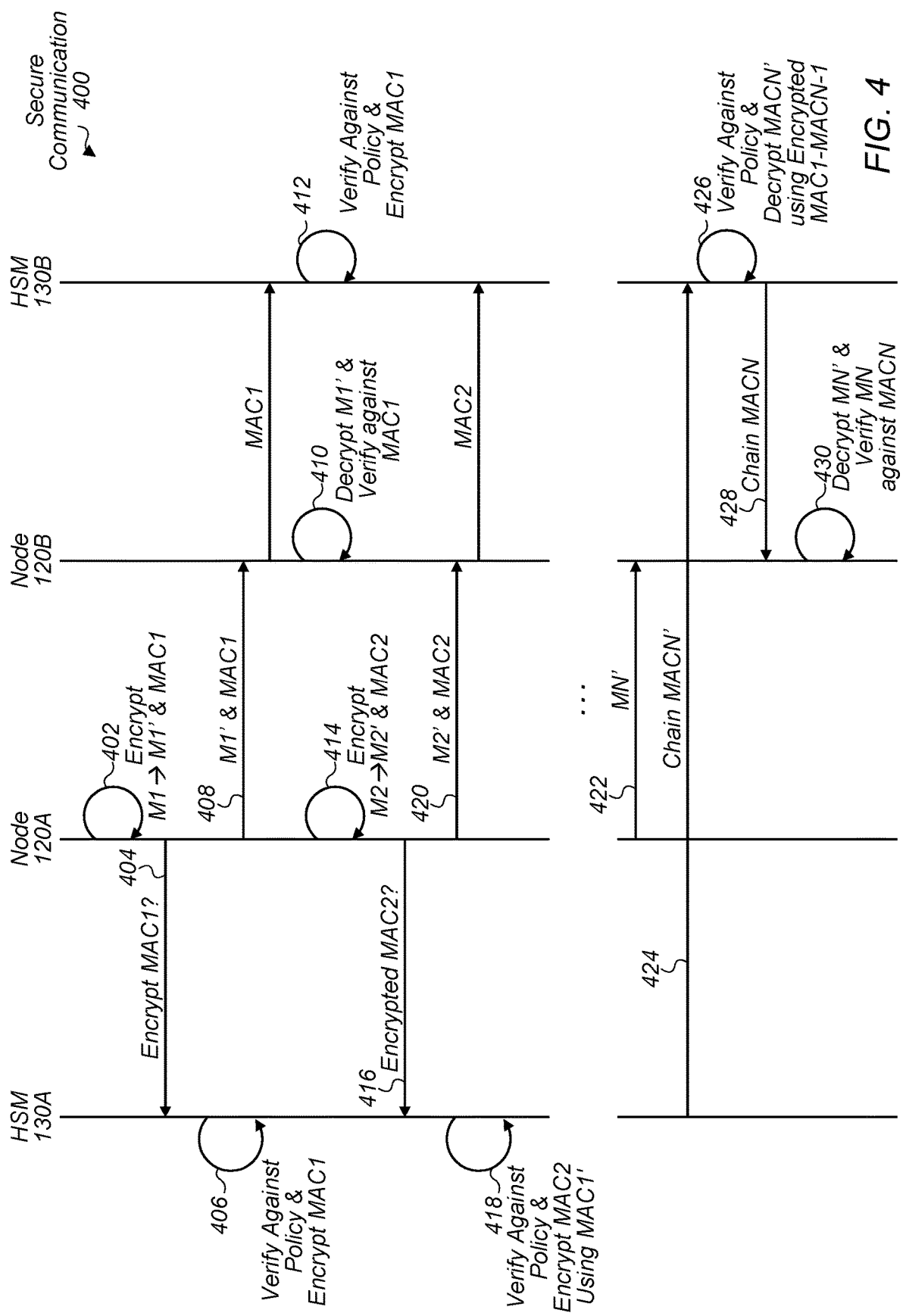
FIG. 4 is a communication diagram illustrating an example of a secure communication of multiple blocks between two nodes.

Turning now to FIG. 4, a communication diagram of another secure communication 400 is depicted. As noted above, in some embodiments, the link 122 between a node 120 and its HSM 130 may have a low transmission rate. Secure communication 400 attempts to reduce the amount of traffic communicated over link 122 by chaining together the encryption of multiple MACs created during the transmission of multiple frames.

As shown, communication 400 begins, at 402, with node 120A encrypting a first message M1 to produce an encrypted message M1' and a first message authentication code MAC1. At 404, node 120A issues an encryption request indicating that MAC1 is being sent to node 120B as part of a stream of messages. At 406, HSM 130A verifies whether the requested operation is authorized by its policy 134 and, if so, proceeds to encrypt MAC1 with the appropriate key 132 to produce MAC1'. Notably, HSM 130A does not provide MAC1' to node 120A; rather, HSM 130A merely stores MAC1' for later use at 416. At 408, node 120A sends M1' and unencrypted MAC1 to node 120B, which forwards MAC1 to HSM 130B for storage. At 410, node 120B decrypts M1' and verifies it against MAC1. At 412, HSM 130B also verifies that eventual decryption of a chained MACN is authorized and, if so, encrypts MAC1, which is used to decrypt MACN at 426 discussed below.

At 414, node 120A encrypts a second message M2 to produce M2' and MAC2, which is provided, at 416, to HSM 130A for encryption. At 418, HSM 130A verifies the encryption is permitted and, if so, uses cipher block chaining to encrypt MAC2 using encrypted MAC1 ' as an input to the encryption function. Thus, encrypted MAC2' is now dependent, not only on the contents of MAC2, but also the contents of MAC1. Again, MAC2' is not communicated to node 120A, but rather stored for use in encryption operations of subsequent MACs associated with the message stream. By not communicating the encrypted MACs back to node 120A, HSM 130A is reducing the amount of traffic being communicated over the link 122. At 420, node 120A communicates M2' and unencrypted MAC2 to node 120B, which forwards MAC2 to HSM 130B for storage.

Node 120A may continue to send encrypted messages and MACs until it reaches a last message MN for the messages stream. At 422, node 120A communicates encrypted MN', but does not send MACN. Instead, at 424, HSM 130A sends a chain MACN' that is dependent on all the earlier MACs as well as MACN. That is, MACN' has been encrypted using encrypted MACN-1' as an input, MACN-1' has been encrypted using MACN-2', and so forth. At 426, HSM 130B verifies decrypting MACN' is in compliance with its policy 134 and, if so, attempts to decrypt MACN' using previously stored MACs (i.e., MAC1-MACN-1). If node 120A has attempted to insert a MAC that has not been provided to HSM 130A (or modifies one of that was provided HSM 130A), HSM 130B may not be able to properly decrypt MACN' causing a verification failure at 430. If the decryption is successful, the decrypted chain MAC is provided to node 120B at 428 for verification at 430 against decrypted MN.

It is noted that, in other embodiments, secure communication 400 may not include node 120B verifying MN against the decrypted MACN received from node 120A at 430 as shown in FIG. 4. Rather, at 422, MACN may be sent by node 120A to node 120B. At 426, HSM 130B may merely attempt to recalculate encrypted MACN' from the MACs previously received and compare this encrypted MACN' with the MACN' received from HSM 130A. If the two encrypted MACs do not match, HSM 130B may indicate an error to node 120B causing the verification at 430 to fail.

Figure 5:
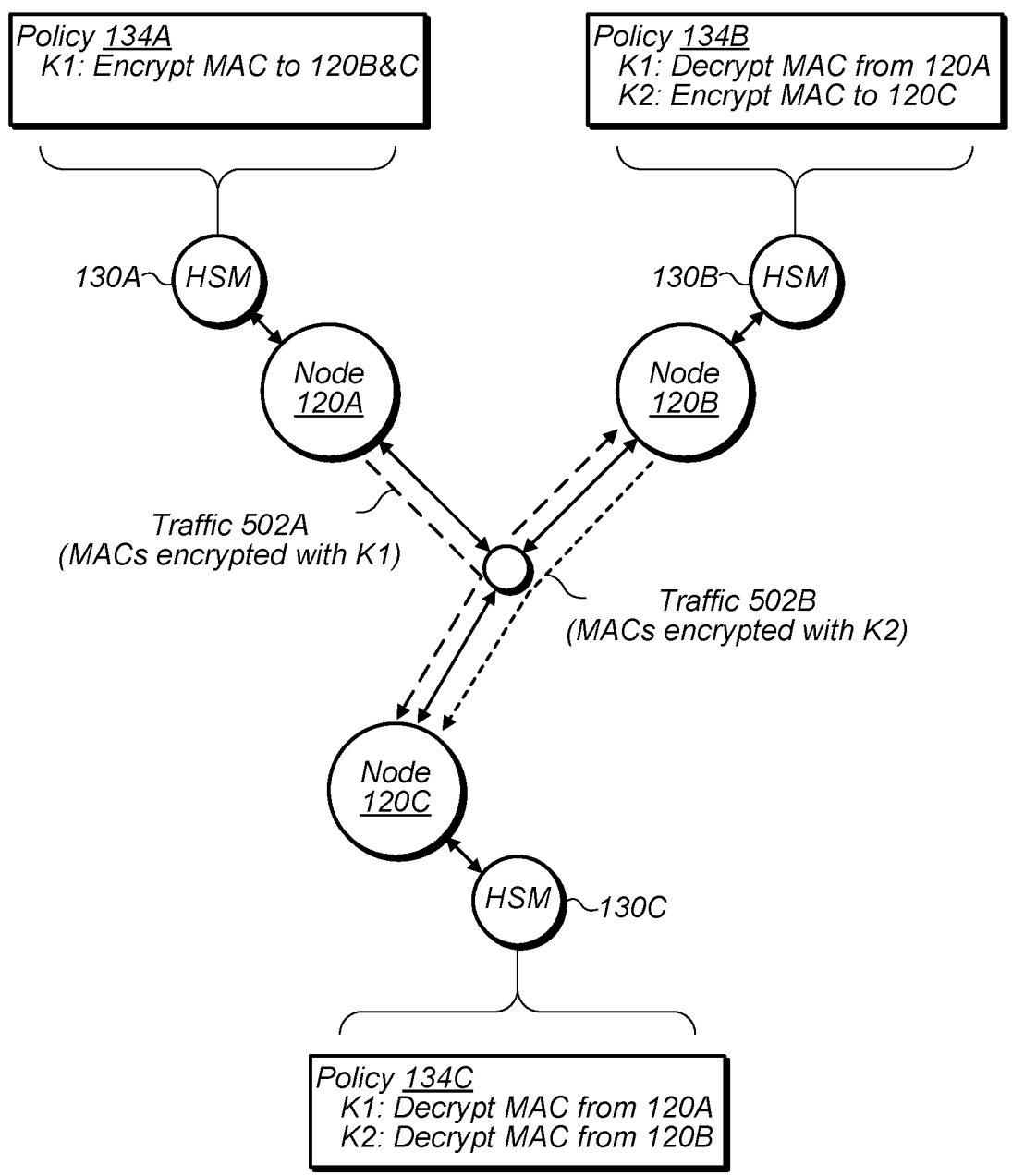
FIG. 5 is a block diagram illustrating an example of policy usage to enforce communication between nodes in the secure network.

Turning now to FIG. 5, an example of a policy usage 500 is depicted. In this example, HSMs 130A, 130B, and 130C have been provisioned with respective policies 134A, 134B, and 134C in order to enable two streams of traffic 502A and 502B.

As shown, traffic 502A is being multicasted from node 120A to nodes 120B and 120C, and includes MACs encrypted with a key 132 shown as K1. Accordingly, since node 120A is the source of traffic 502A, its HSM 130A is provisioned with K1 and a policy 134A indicating that encryption is permitted with K1 when nodes 120B and 120C are the destinations of the traffic. Although depicted as "K1: Encrypt MACs to 120B&C" for illustration purposes, in some embodiments, policy 134A may express this criterion as the tuple (Encrypt, [Node 120B's network address, Node 120C's network address]). Since nodes 120B and 120C are the destinations of traffic 502A, HSMs 130B and 130C are provisioned with K1 and policies 134B and 134C indicating that decryption is permitted with K1 when node 120A is the source. Notably, nodes 120B and 120C would not be permitted in this example to use K1 to send traffic to node 120A or one another as this would not be unauthorized by their respective policies 134. Thus, if node 120C became compromised and attempted to do so, node 120C would be restricted from doing so by HSMs 130A and 130B and their policies 134.

Continuing with the example in FIG. 5, traffic 502B is being communicated from node 120B to node 120C, and includes MACs encrypted with another key 132 K2. As shown, policy 134B indicates that HSM 130B is permitted to perform encryption with K2 when the destination is node 120C. Policy 134C also indicates that HSM 130C is permitted to perform decryption with K2 when the source is node 120B. Notably, in this example, HSM 130A is not provisioned with K2 (and its policy 134A does not specify any permitted uses with K2) as node 120A is not intended to communicate traffic 502B.

Figures 6A, 6B:
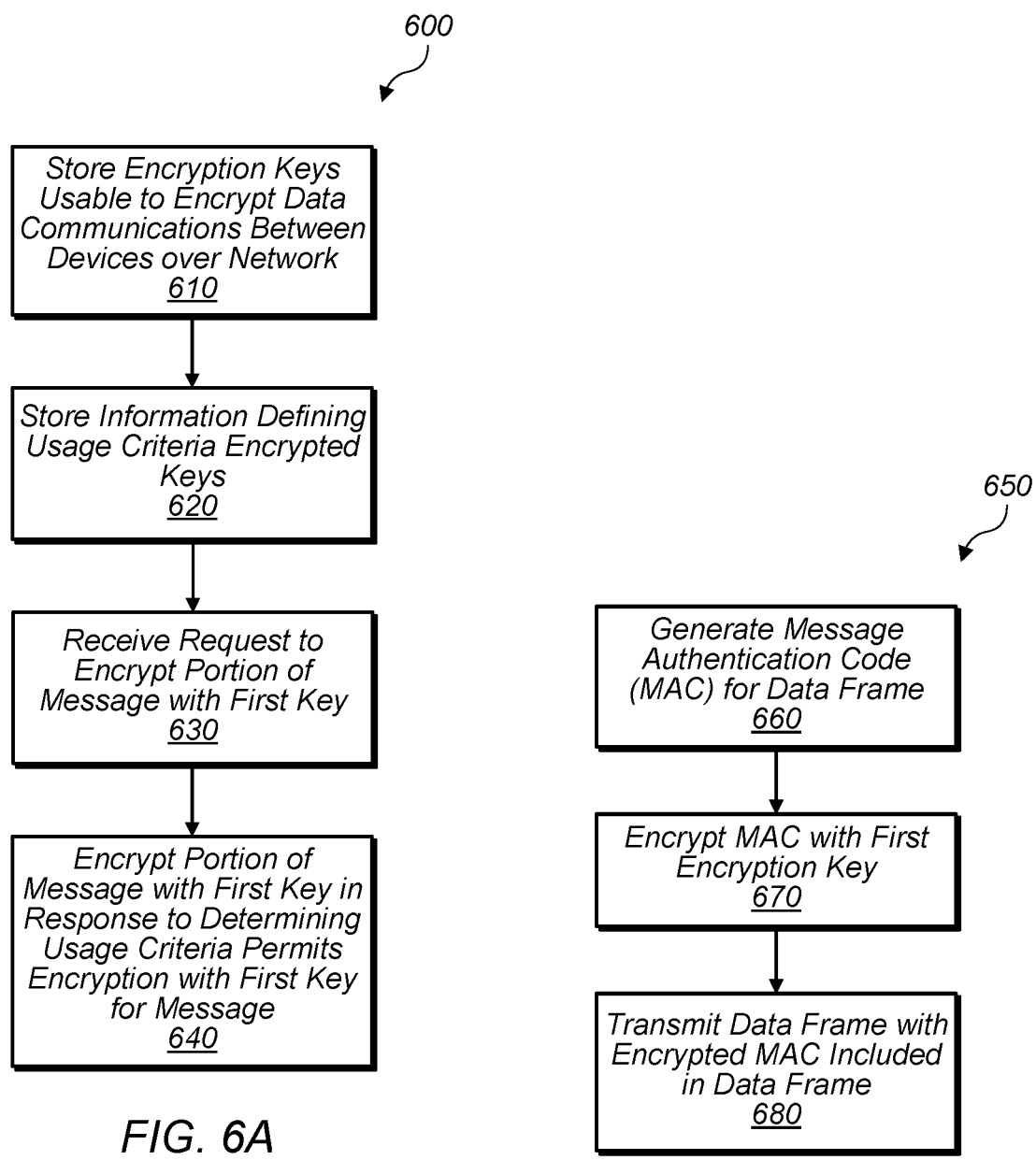
FIGS. 6A and 6B are flow diagrams illustrating examples of methods for secure network communication.

Turning now to FIG. 6A, a flow diagram of a method 600 for communicating traffic over a network is depicted. Method 600 is one embodiment of a method that may be performed by a secure circuit such as an HSM 130. In some instances, performance of method 600 may allow for more secure network communications. In some embodiments, steps 610-640 may be performed in parallel or in a different order than shown.

In step 610, the secure circuit stores a plurality of encryption keys (e.g., keys 132) usable to encrypt data communications between a plurality of devices (e.g., nodes 120) over a network (e.g., secure network 100). In some embodiments, the secure circuit is coupled to a first of the plurality of devices (e.g., HSM 130A coupled to node 120A). In some embodiments, the encryption keys are received from a gateway (e.g., gateway 140) configured to facilitate communication over a wide area network, receive a set of replacement keys from an entity over the wide area network, and distribute ones of the replacement keys to the plurality of devices.

In step 620, the secure circuit stores information that defines a set of usage criteria (e.g., a policy 134) for the plurality of encrypted keys. The set of usage criteria specifies that a first of the plurality of keys (e.g., policy 134B referencing key K2 shown in FIG. 4) is dedicated to encrypting data being communicated from a first of the plurality of devices (e.g., node 120B) to a second of the plurality of devices (e.g., node 120C). In some embodiments, the stored information specifies a tuple for each of the plurality of keys such that each tuple 1) includes an indication of whether that key is dedicated to encryption or decryption, and 2) identifies one or more of the plurality of devices associated with that key. In some embodiments, the set of usage criteria indicates that the first key is dedicated to encrypting data communications in one direction between the first and second devices but not in the other direction.

In step 630, the secure circuit receives a request to encrypt a portion of a message (e.g., a MAC) with the first key. In some embodiments, the request indicates that the message is being sent from the first device to the second device.

In step 640, the secure circuit encrypts the portion of the message with the first key in response to determining that the set of usage criteria permits encryption with the first key for a message being sent from the first device to the second device. In some embodiments, the secure circuit is configured to encrypt the portion of the message such that the encrypted portion is usable to establish that the message is sent by the first device.

Turning now to FIG. 6B, a flow diagram of another method 650 for communicating traffic over a network is depicted. Method 650 is one embodiment of a method that may be performed by an apparatus that includes one or more ECUs (such as nodes 120 in some embodiments) and one or more secure circuits (such as HSMs 130). In some instances, performance of method 650 may allow for more secure network communications.

In step 660, a first electronic control unit (ECU) generates a message authentication code (MAC) for a data frame to be transmitted from the first ECU to a second ECU.

In step 670, a first secure circuit coupled to the first ECU encrypts the MAC with a first encryption key (e.g., a key 132). In some embodiments, the first ECU indicates, to the first secure circuit, that the second ECU is a destination of the data frame, and step 670 includes the first secure circuit determining whether to allow encryption of the MAC with the first encryption key based on the identified destination of the data frame. In some embodiments, the first secure circuit store a plurality of encryption keys including the first encryption key, and stores a policy (e.g., a policy 134) that specifies, for ones of the plurality of encryption keys, a respective use and a respective set of associated ECUs. In such an embodiment, the policy specifies that the first encryption key is to be used for encryption and is associated with a set of ECUs that includes the second ECU. In such an embodiment, the first secure circuit determines whether to sign the MAC with the first encryption key based on the stored policy. In some embodiments, the first secure circuit receives the first encryption key from a network gateway configured to receive a set of keys via a wireless network interface and distribute the set of keys to the secure circuit.

In step 680, the first ECU transmits the data frame with the encrypted MAC included in the data frame. In various embodiments, a second secure circuit coupled to the second ECU decrypts the encrypted MAC included in the data frame, and the second ECU verifies integrity of the data frame using the decrypted MAC. In some embodiments, the first secure circuit is coupled to the first ECU via a first interconnect (e.g., a link 122), and the first ECU transmits the data frame to the second ECU via a second interconnect (e.g., a link 112) that is different from the first interconnect.

Figure 7:
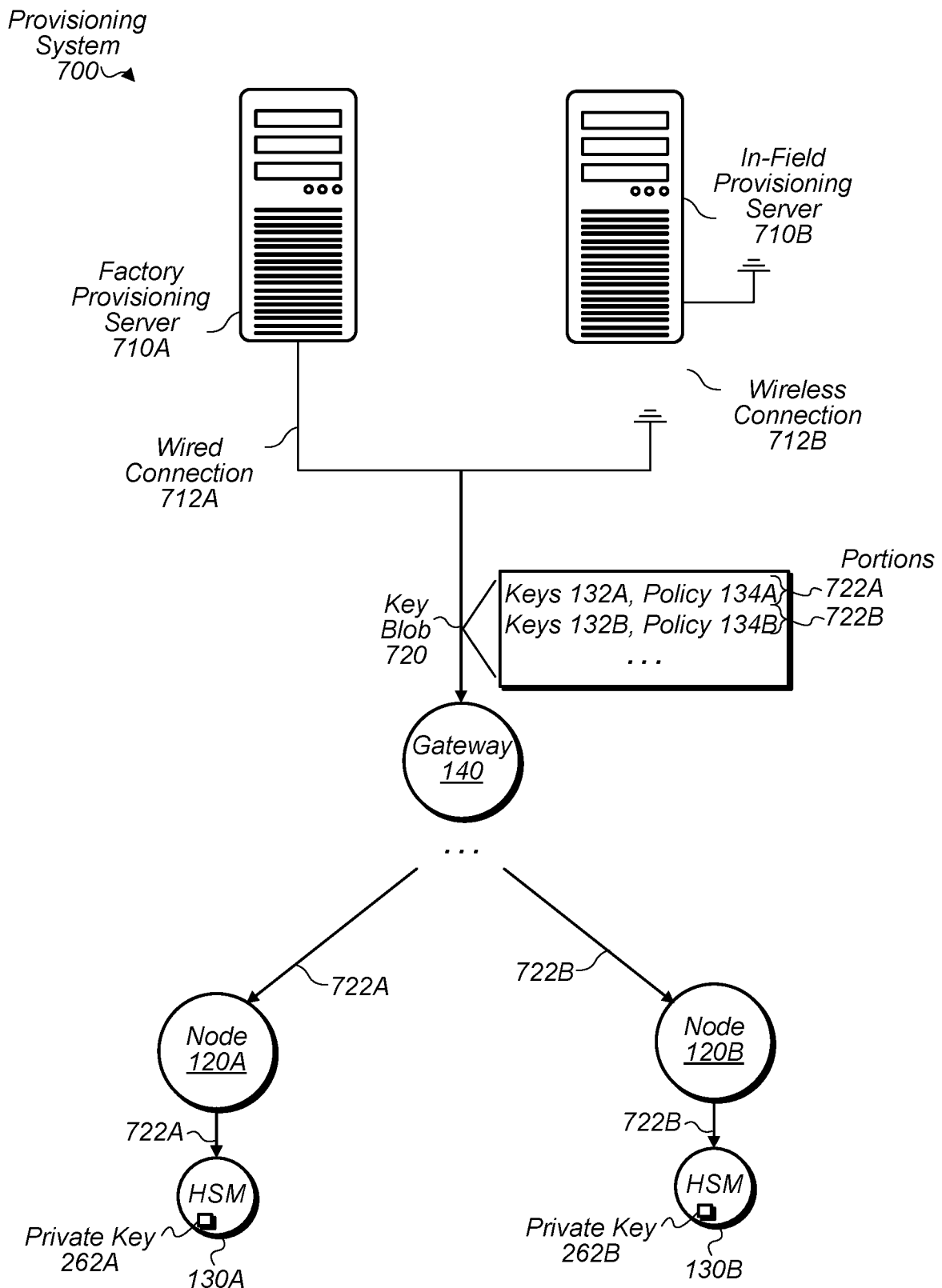
FIG. 7 is a block diagram illustrating an example of network provisioning.

Turning now to FIG. 7, a block diagram of a provisioning system 700 is depicted. In various embodiments, provision system 700 is usable to provision network components of network 100 including provisioning HSMs 130 with keys 132 and policies 134. In the illustrated embodiment, system 700 includes a factory provisioning server 710A, an in-field provisioning server 710B, and gateway 140. In some embodiments, system 700 may be implemented differently than shown—e.g., a single provisioning server 710 may be used. Functionality described below with respect to servers 710 may be performed by a server other than one that handles providing a key blob 720.

Factory provisioning server 710A, in the illustrated embodiment, is a server configured to initially provision network 100 when network 100 is being assembled. In various embodiments, server 710A performs registering private keys 262 as discussed below with respect to FIG. 8A, assigning roles to HSMs 130 as discussed with respect to FIG. 8B, providing firmware updates to nodes 120, providing keys 132 and policies 134, and notifying HSMs 130 of any key invalidations. In some embodiments, server 710A is coupled to network 100 via a wire connection 712A as server 710A may be collocated with network 100 during this assembly—e.g., network 100 and server 710A may be located in the same factory. As such, one or more operations performed by factory provisioning server 710A may be repeated by in-field provisioning server 710B due to security considerations. That is, due to the collocation of server 710A and network 100, a malicious person having access to both might have an advantage in obtaining access to keys 132. As a result, keys 132 and policies 134 issued by server 710A may be valid for only a short period—e.g., twenty-four hours.

In-field provisioning server 710B, in the illustrated embodiment, is configured to perform any subsequent provisioning of network 100. In some embodiments, server 710B performs one or more of the same operations performed by server 710A noted above. In various embodiments, however, server 710B is not collocated with network 100 and may be coupled to network 100 via a wireless connection 712B associated with a wide area network (WAN) such as the Internet. As such, provisioning performed by server 710B may be more secure than provisioning performed by server 710A. Thus, keys 132 and policies 134 issued by server 710B may be valid for a longer period than those issued by server 710A.

In various embodiments, gateway 140 is configured to facilitate provisioning for network 100 by establishing secure communication with servers 710. In some embodiments, gateway 140 also performs distribution of keys 132 and policies 134 to HSMs 130. In the illustrated embodiment, keys 132 and policies 134 are packaged into a key blob 720, which may be divided into multiple portions 722 each associated with a respective one of HSMs 130 as shown. For example, portion 722A includes keys 132A and policy 134A for HSM 130A; portion 722B includes keys 132B and policy 134B. In such an embodiment, gateway 140 may decrypt an encrypted version of a blob 720 received from a server 710, determine the correspondence of each portion 722 to each HSM 130, and appropriately route each portion 722 to its respective HSM 130. In some embodiments, key blobs 720 may be received when a network 100 is initially assembled, when a new node 120 is added to network 100, and when firmware updates of nodes 120 are performed.

In order to prevent a compromised gateway 140 from gaining access to keys 132 and policies 134, multiple techniques may be used in some embodiments. First, although the key blob may be encrypted, each portion 722 may be further encrypted for a key held by each HSM 130. In some embodiments, each portion 722 (e.g., portion 722A) is encrypted using a public key specified in a certificate 242 and decryptable with a private key 262 (e.g., private key 262A).

In other embodiments, each portion 722 is encrypted and decrypted using ephemeral keys derived from a server 710's certificate and private key and HSM 130's certificate 242 and private key 262 via Elliptic Curve Diffie-Hellman (ECDH). Second, in some embodiments, each HSM 130 applies a modification function to keys 132 to adjust them to new values. Thus, even if gateway 140 could view a key 132, this key 132 is later modified by the HSMs 130 that hold this key. Notably, the modified keys 132 are also unknown to the servers 710 that initially provided them. Thus, if some malicious person could gain access to a key 132 at a server 710, this key 132 has since been modified making it unknown to the malicious person.

Figure 8A:
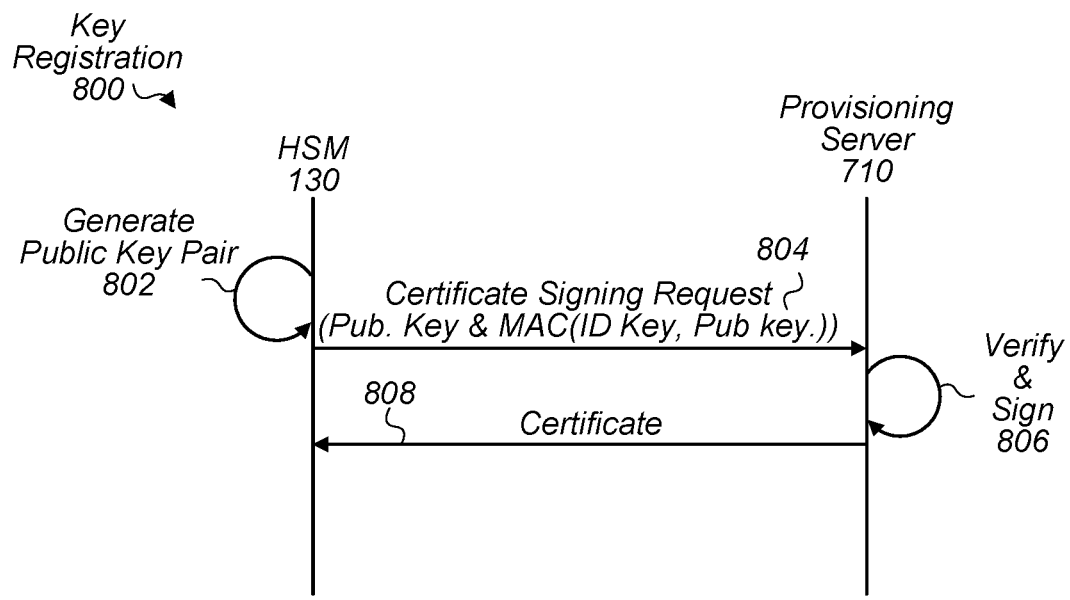
FIGS. 8A and 8B are communication diagrams illustrating exemplary communications associated with network provisioning.

Turning now to FIG. 8A, a communication diagram of a key registration 800 is depicted. Key registration 800 is one embodiment of a communication for registering a public key pair usable to communicate encrypted data between an HSM 130 and a provisioning server 710 (or some other server that handles key registration). In various embodiments, key registration 800 may be performed when a node 120 is fabricated, when network 100 is assembled, or when a new node 120 is added to network 100.

As shown, key registration 800 begins at 802 with an HSM 130 generating a public key pair that includes provisioning private key 262. At 804, the HSM 130 sends a certificate signing request (CSR) for a public key certificate 242. In the illustrated embodiment, the request includes the public key of the pair and a message authentication code computed by applying a keyed function to the public key where identity key 264 is used as the key for the function. In some embodiments, the request may include more (or less) contents such as capability information 244. In some embodiments, the request is compliant with a standard such as public-key cryptographic standards (PKCS) 10. At 806, provisioning server 710 verifies the request including confirming the MAC was computed by identity key 264. If the verification is to successful, server 710 signs a certificate 242 that includes the public key and attests to the validity of the public key. (Accordingly, in various embodiments, server 710 is configured to implement a certificate authority (CA).) At 808, server 710 sends the signed certificate 242 to the HSM 130, where HSM 130 may later present the certificate 242 to server 710 in order to receive encrypted data from server 710.

Figure 8B:
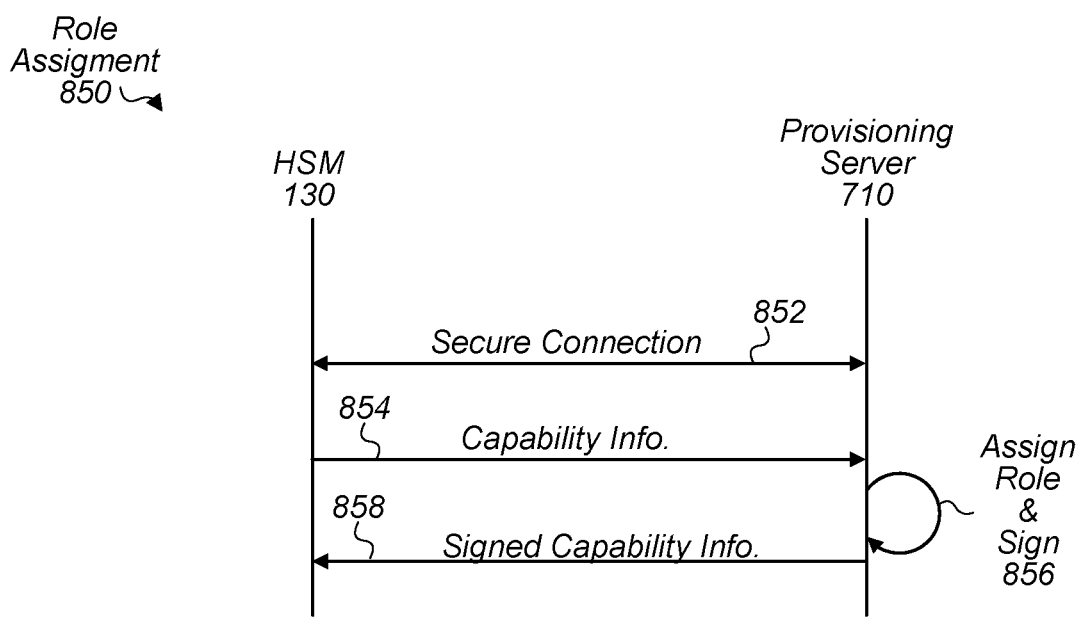

Turning now to FIG. 8B, a communication diagram of a role assignment 850 is depicted. Role assignment 850 is one embodiment of a communication to assign a role to an HSM 130 that is unable to subsequently determine which keys 132 and policies 134 should be provided to the HSM 130. In some embodiments, role assignment 850 may be performed when a new node 120 is created in fabrication, during assembly of network 100, or after assembly.

As shown, role assignment 850 begins at 852 with an HSM 130 and provisioning server 710 (or some other server involved in role assignment) establishing a secure connection. In some embodiments, this connection may be established using the identity key 246 via EDCH. At 854, HSM 130 sends capability information 244 to provisioning server 710. As noted above, capability information 244 may identify various capabilities of the node 120 coupled to the HSM 130. In some embodiments, this information 244 may be provided by a manufacturer of node 120. At 856, provisioning server 710 reviews the capability information 244 and assigns a role to the node 120. For example, if a node 120 is capable of working with a headlight or a taillight, server 710 may assign the node 120 the headlight role. As shown, server 710 may generate a digital signature from the data specifying the assigned role. At 858, server 710 sends the signed capability information 244 back to HSM 130, which may later present the signed information in order to receive appropriate keys 132 and policies 134. In some embodiments, server 710 may also store a copy of capability information 244.

Notably, in signing the capability information 244, server 710 prevents a malicious entity from altering the role assigned to a node 120. Server 710 may also prevent counterfeit devices from being used. That is, if an HSM 130 lacks signed capability information 244, in some embodiments, it is unable to be provisioned with keys 132 and policies 134, and thus, unable to communicate with other nodes 120. Moreover, a counterfeit device may also lack an identity key 246, which, in some embodiments, is a prerequisite for establishing the secure connection with the provisioning server 710.

Figure 9:
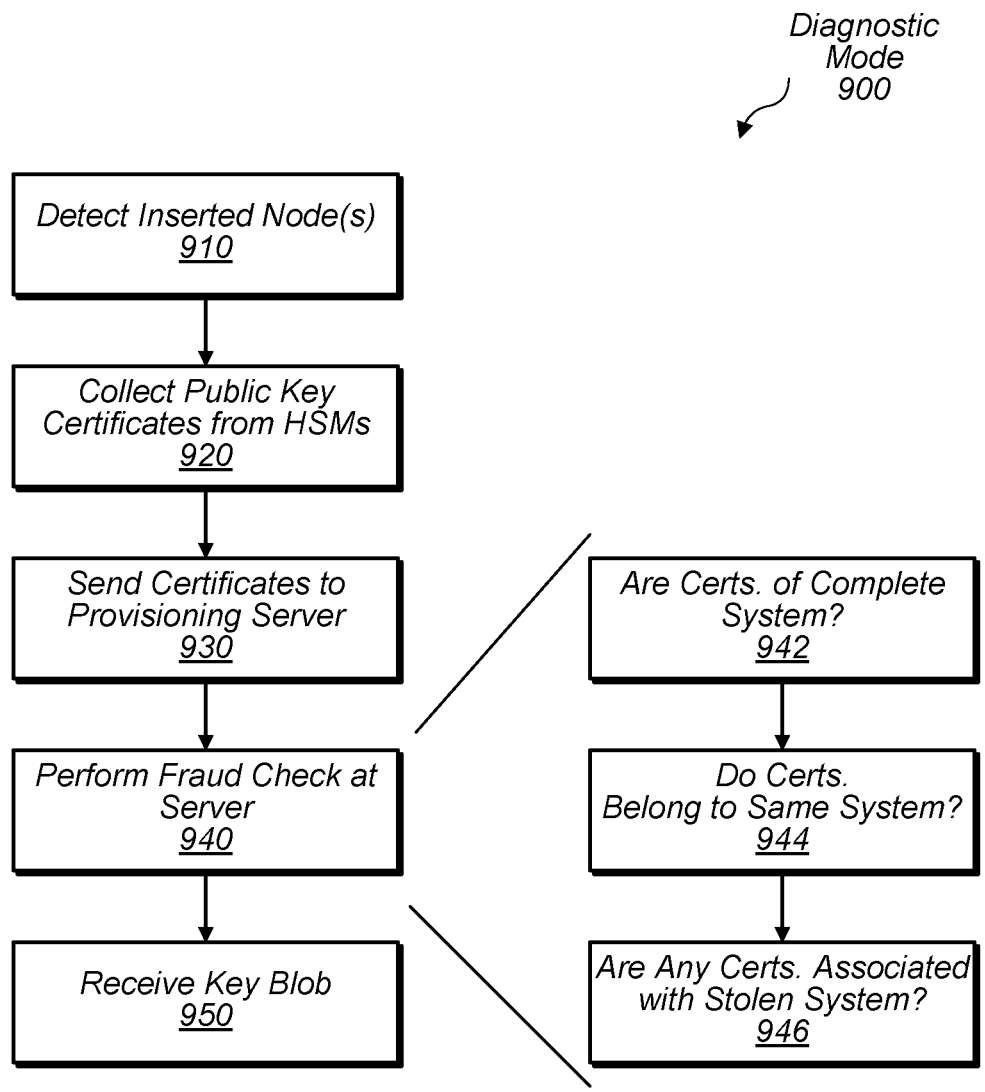
FIG. 9 is a flow diagram of an exemplary method for a diagnostic mode associated with the secure network.

Turning now to FIG. 9, a flow diagram of a diagnostic mode 900 is depicted. In some embodiments, gateway 140 is configured to support a diagnostic mode 900 in which gateway 140 provides various information about network 100 and allows a user to select various operations that can be performed including the provisioning of network 100. Accordingly, in some embodiments, diagnostic mode 900 may be invoked when assembling network, updating firmware in nodes 120 and/or HSMs 130, and replacing nodes 120 in network 100. FIG. 9 depicts a sequence of steps that may be performed by gateway 140 and/or provisioning server 710 upon being instructed to enter diagnostic mode 900.

As shown, the steps of diagnostic mode 900 begin at step 910 with the detection of any nodes 120 inserted into network 100. In response to detecting a node 120, gateway 140 collects its public key certificate 242 from its HSM 130 in step 920. In some instances, gateway 140 may determine that an HSM 130 does not have a certificate 242 or has an invalid one. If so, gateway 140 may instruct the HSM 130 to perform a key registration such as discussed above with FIG. 8A. In some embodiments, if gateway 140 has difficulty communicating with a node 120 or HSM 130, gateway 140 may identify the communication error. In step 930, gateway 140 sends the collected certificates 242 to a provisioning server 710.

In step 940, the provisioning server 710 performs a fraud check to determine whether any issues exist with the nodes 120 coupled to network 100. (In other embodiments, some or all of step 940 may be performed by gateway 140.) As shown, this check may include the performance of steps 942-946, which may include more (or less steps) than shown in FIG. 9 in some embodiments. In step 942, a determination is made whether the sent certificates 242 are of a complete system. For example, in some embodiments in which nodes 120 are ECUs, step 942 may include determining, based on the certificates 242, whether a complete set of ECUs exists for a vehicle. In some embodiments, step 942 may include examining capability information 244 included in the certificates 242 as noted above. If certificates 242 are missing, it may be attributable to one or more nodes 120 being absent from network 100 or a counterfeit node 120 being inserted into network 100. In step 944, a determination is made whether the sent certificates 242 belong to the same system. If certificates 242 for two different systems are received, it may be the case that someone has attempted to take nodes 120 from one system and combine them with nodes 120 of another indicating a potential security problem. In step 946, another determination is made whether any of the certificates are associated with a stolen system. In some embodiments, if a system is reported as stolen, provisioning server 710B may add the certificates 242 to a blacklist and refuse to provision any network 100 that includes an HSM 130 with a certificate on the blacklist. Provisioning server 710 may also instruct HSMs 130 to invalidate any keys 132 used to communicate with the HSM 130 having a blacklisted certificate 242. In doing so, server 710 may prevent communications over network 100, which may effectively brick the system including network 100.

If the fraud check fails, gateway 140 may receive information identifying why the check failed from provisioning server 710, and present the information to the user that initiated diagnostic mode 900. If the fraud check completes successfully, however, gateway 140 may receive and distribute a key blob 720 in step 950 as discussed above with FIG. 7.

Figure 10A:
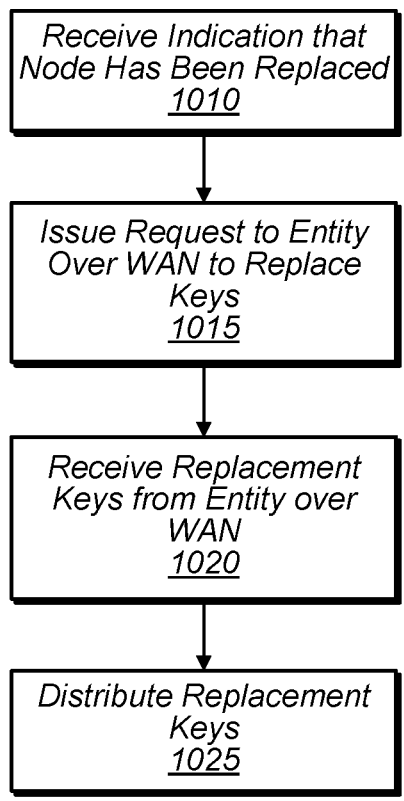
FIGS. 10A-C are flow diagrams of exemplary methods associated with network provisioning.

Turning now to FIG. 10A, a flow diagram of a method 1000 for provisioning one or more nodes in a network is depicted. Method 1000 is one embodiment of a method that may be performed by a computing device such as gateway 140. In some instances, performance of method 1000 may allow for more secure network communications.

In step 1010, the computing device receives an indication that one of a plurality of ECUs has been replaced. In various embodiments, the plurality of electronic control units (ECUs) control operations of a vehicle, and controlling the operations includes communicating data (e.g., MACs) between ECUs that is encrypted using a set of keys (e.g., keys 132).

In step 1015, the computing device issues, in response to the indication, a request to an entity (e.g., a provisioning server 710) over a wide area network (WAN) to replace the set of keys.

In step 1020, the computing device receives a set of replacement keys (e.g., a key blob 720) from the entity over the WAN. In some embodiments, step 1020 also includes receiving policy information (e.g., policies 134) defining uses for replacement keys in the set. In such an embodiment, the policy information identifies, for a first key in the set, 1) one of the plurality of ECUs as being authorized to send data encrypted with the first key and 2) one or more of the plurality of ECUs as being authorized to receive data encrypted with the first key. In some embodiments, step 1020 also includes receiving an indication that one or more of the replacement keys have been invalidated.

In step 1025, the computer device distributes the set of replacement keys to the plurality of ECUs. In some embodiments, a first secure circuit coupled to a first of the plurality of ECUs (e.g., HSM 130A coupled to Node 120A) receives a replacement key distributed to the first ECU and services requests from the first ECU to encrypt data with the replacement key. In some embodiments, prior to servicing requests from the first ECU, the secure circuit modifies the replacement key in a manner that causes the replacement key to be unknown to the gateway. In some embodiments, step 1025 also includes distributing policy information received with the set of replacement keys in step 1020. In some embodiments, step 1025 also includes notifying the plurality of ECUs to discontinue use of one or more replacement keys indicated as being invalidated in step 1020.

Figure 10B:
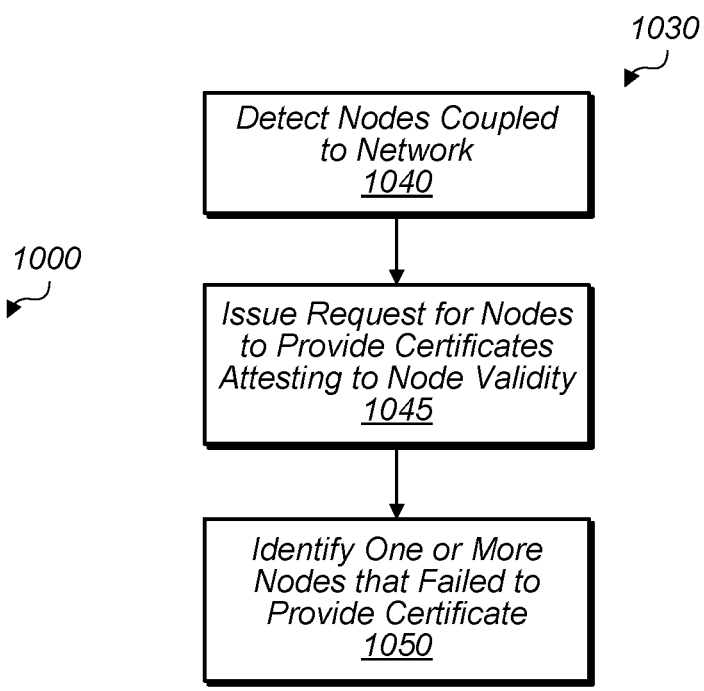

Turning now to FIG. 10B, a flow diagram of a first method 1030 for detecting an unauthorized node is depicted. In some embodiments, method 1030 may be performed by gateway 140 or a provisional server 710 during diagnostic mode in order to identify a potentially counterfeit node 120 inserted into network 100.

Method 1030 begins in step 1040 a computer system detecting a plurality of nodes (e.g., nodes 120) coupled to a network (e.g., network 100). In some embodiments, the plurality of nodes includes electronic control units (ECUs) configured to control operation of a vehicle. In step 1045, the computer system issues a request for ones of the plurality of nodes to provide certificates (e.g., certificates 242) attesting to a validity of the nodes. In some embodiments, method 1030 includes the computer system receiving a certificate associated with one of the plurality of nodes from a secure circuit (e.g., an HSM 130) configured to receive the certificate from a certificate authority (CA) (e.g., via key registration 800) and store the certificate for the node. In step 1050, the computer system identifies one or more of the nodes that failed to provide a certificate in response to the request. In some embodiments, the identifying includes indicating that the one or more nodes are unauthorized for use with the network.

Figure 10C:
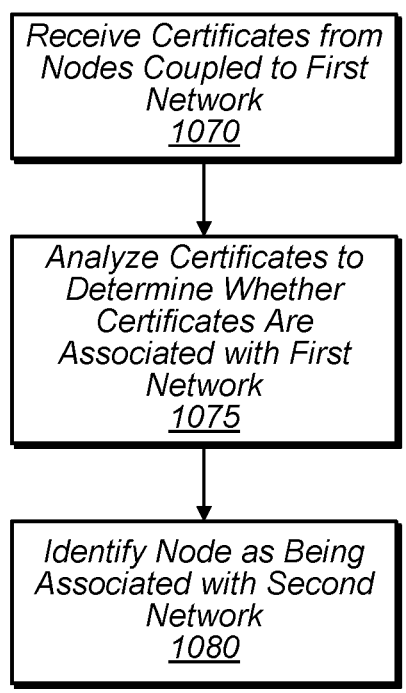

Turning now to FIG. 10C, a flow diagram of a second method 1060 for detecting an unauthorized node is depicted. In some embodiments, method 1060 may be performed by a provisional server 710 or gateway 140 during diagnostic mode in order to identify a node 120 removed from one network 100 and inserted into another network 100—e.g., an ECU removed from a potentially stolen vehicle and inserted into another vehicle.

Method 1060 begins in step 1070 with a computer system receiving certificates (e.g., certificates 242) from a plurality of nodes (e.g., nodes 120) coupled to a first network (e.g., network 100). In step 1075, the computer system analyzes the certificates to determine whether the certificates are associated with the first network. In some embodiments, method 1060 includes the computer system receiving a request to issue a certificate to a first of the plurality of nodes, the request identifying the first node as being associated with the first network. The computer system issues the certificate to the first node and stores an indication of the certificate in a list of certificates associated with the first network. In such an embodiment, step 1075 further includes analyzing the list. In some embodiments, method 1060 includes the computer system receiving a request to issue a certificate to a first of the plurality of nodes, the request identifying the first node as being associated with the first network. The computer system issues the certificate to the first node such that the certificate includes an indication specifying that the first node is associated with the first network. In such an embodiment, step 1075 includes analyzing the indication included in the certificate. In step 1080, the computer system identifies, based on the analyzing, one of the plurality of nodes as being associated with a second network.

Exemplary Computer System

Figure 11:
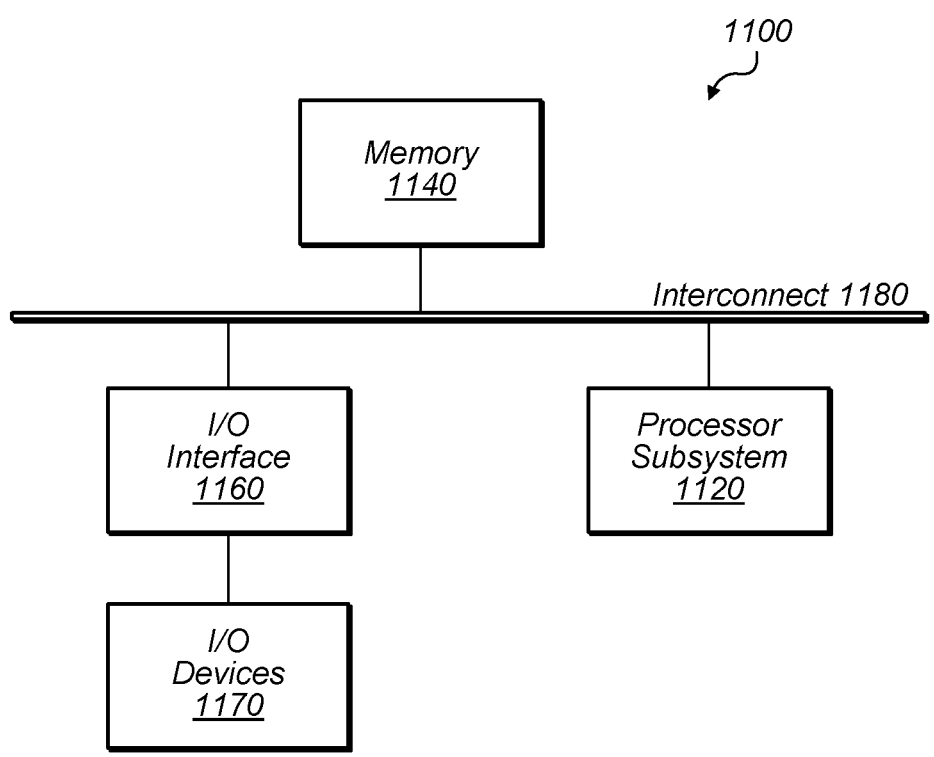
FIG. 11 is a block diagram illustrating an exemplary computer system, which may implement one or more components of the secure network.

Turning now to FIG. 11, a block diagram of an exemplary computer system 1100 is depicted. Computer system 1100 is one embodiment of a computer system that may be used to implement one or more of nodes 120, gateway 140, servers 710, etc. In the illustrated embodiment, computer system 1100 includes a processor subsystem 1120 that is coupled to a system memory 1140 and I/O interfaces(s) 1160 via an interconnect 1180 (e.g., a system bus). I/O interface(s) 1160 is coupled to one or more I/O devices 1170. Computer system 1100 may be any of various types of devices, including, but not limited to, a server system, personal computer system, network computer, an embedded system, etc. Although a single computer system 1100 is shown in FIG. 11 for convenience, system 1100 may also be implemented as two or more computer systems operating together.

Processor subsystem 1120 may include one or more processors or processing units. In various embodiments of computer system 1100, multiple instances of processor subsystem 1120 may be coupled to interconnect 1180. In various embodiments, processor subsystem 1120 (or each processor unit within 1120) may contain a cache or other form of on-board memory.

System memory 1140 is usable store program instructions executable by processor subsystem 1120 to cause system 1100 perform various operations described herein. System memory 1140 may be implemented using different physical, non-transitory memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 1100 is not limited to primary storage such as memory 1140. Rather, computer system 1100 may also include other forms of storage such as cache memory in processor subsystem 1120 and secondary storage on I/O Devices 1170 (e.g., a hard drive, storage array, etc.). In some embodiments, these other forms of storage may also store program instructions executable by processor subsystem 1120 to perform operations described herein.

I/O interfaces 1160 may be any of various types of interfaces configured to couple to and communicate with other devices, according to various embodiments. In one embodiment, I/O interface 1160 is a bridge chip (e.g., Southbridge) from a front-side to one or more back-side buses. I/O interfaces 1160 may be coupled to one or more I/O devices 1170 via one or more corresponding buses or other interfaces. Examples of I/O devices 1170 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 1100 is to coupled to a network via a network interface device 1170 (e.g., configured to communicate over WiFi, Bluetooth, Ethernet, etc.).

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Accordingly, new claims may be formulated during prosecution of this application (or an application claiming priority thereto) to any such combination of features. In particular, with reference to the appended claims, features from dependent claims may be combined with those of the independent claims and features from respective independent claims may be combined in any appropriate manner and not merely in the specific combinations enumerated in the appended claims.

What is claimed is:

1. An apparatus, comprising:
 a secure circuit configured to:
  store a plurality of keys usable to encrypt data communications between a plurality of devices over a network;
  store information that defines a set of usage criteria for the plurality of keys, wherein the set of usage criteria specifies that a first of the plurality of keys is limited to encrypting data being communicated from a first of the plurality of devices to a second of the plurality of devices;
  receive, from the first device, a particular request to encrypt a portion of a message with the first key, wherein the particular request indicates that the message is being sent from the first device to the second device;
  determine that the set of usage criteria authorizes use of the first key for encrypting data to be sent to the second device;
  in response to the determination that the use is authorized, encrypt the portion of the message with the first key;
  receive, from the first device, a different request to encrypt a portion of a different message with the first key, wherein the different request indicates that the different message is being sent from the first device to a third device;
  determine that the set of usage criteria does not authorize use of the first key for encrypting data to be sent to the third device; and
  in response to the determination that the use is not authorized, send a response indicating that the different request has been denied.

2. The apparatus of claim 1, further comprising:
 the plurality of devices, wherein the secure circuit is coupled to the first device; and
 wherein the secure circuit is configured to encrypt the portion of the message such that the encrypted portion is usable to establish that the message is sent by the first device.

3. The apparatus of claim 1, wherein the secure circuit is configured to:
 receive a portion of another message sent from the third device of the plurality of devices, wherein the portion of the other message is encrypted by another secure circuit coupled to the third device;
 select, based on the set of usage criteria, a second key dedicated to decrypting data communications being sent from the third device to the first device; and
 decrypt the portion of the other message with the second key.

4. The apparatus of claim 1, wherein the stored information specifies a tuple for each of the plurality of keys, wherein each tuple 1) includes an indication of whether that key is dedicated to encryption or decryption, and 2) identifies one or more of the plurality of devices associated with that key.

5. The apparatus of claim 1, wherein the set of usage criteria received by the first device for the plurality of keys is unique to the first device.

6. The apparatus of claim 1, further comprising:
a gateway configured to:
    facilitate communication over a wide area network;
    receive a set of replacement keys from an entity over the wide area network; and
    distribute ones of the replacement keys to the plurality of devices.

7. The apparatus of claim 6, wherein the gateway is configured to:
    issue a request for the set of replacement keys in response to an indication that one of the plurality of devices has been replaced with a new device.

8. The apparatus of claim 1, further comprising:
the plurality of devices, wherein the plurality of devices includes electronic control units (ECUs) configured to control operations of a vehicle; and
wherein the secure circuit is configured to encrypt portions of messages associated with operations controlled by the first device.

9. An apparatus, comprising:
a first network node configured to communicate a messages over a network that includes a second network node and a third network node; and
a secure circuit coupled to the first network node, wherein the secure circuit is configured to:
    receive, from a hardware entity external to the secure circuit, a policy defining one or more usage criteria for an encryption key, wherein a given one of the usage criteria specifies that the encryption key is limited to encrypting data being communicated from the first network node to the second network node;
    store the encryption key and the policy;
    receive a particular request from the first network node to encrypt a portion of a message, where the particular request indicates that the message is being sent from the first network node to the second network node;
    determine that the given one of the usage criteria authorizes use of the first key for encrypting data to be sent to the second network node;
    in response to the determination that the use is authorized, encrypt the portion with the encryption key;
    receive a different request from the first network node to encrypt a portion of a different message, wherein the different request indicates that the different message is being sent from the first network node to the third network node;
    determine that none of usage criteria in the policy authorize use of the encryption key for encrypting data to be sent to the third network node; and
    in response to the determination that the policy does not include authorized use, send a response indicating that the different request has been denied.

10. The apparatus of claim 9, further comprising:
the second network node; and
a second secure circuit, coupled to the second network node, configured to:
    receive, from the hardware entity, a different policy defining one or more different usage criteria for the encryption key, wherein a given one of the different usage criteria specifies that the encryption key is limited to decrypting data being communicated from the first network node to the second network node.

11. The apparatus of claim 10, further comprising:
the third network node; and
a third secure circuit, coupled to the third network node, configured to:
    receive, from the hardware entity, a different policy including no usage criteria for the encryption key; and
    determine that the different policy does not permit usage of the encryption key by the third network node.

12. The apparatus of claim 9, wherein the policy identifies the second network node as a permissible destination by referencing a media access control (MAC) address of the second network node.

13. The apparatus of claim 9, wherein the policy indicates that encryption is permissible with the encryption key, but not decryption with the encryption key.

* * * * *

UNITED STATES PATENT AND TRADEMARK OFFICE
CERTIFICATE OF CORRECTION

PATENT NO. : 11,595,366 B2  
APPLICATION NO. : 16/329714  
DATED : February 28, 2023  
INVENTOR(S) : Tristan F. Schaap et al.

Page 1 of 1

It is certified that error appears in the above-identified patent and that said Letters Patent is hereby corrected as shown below:

In the Claims

Column 19, Line 23, delete "communicate a" and insert --communicate--.

Signed and Sealed this  
Twenty-seventh Day of June, 2023

Katherine Kelly Vidal  
*Director of the United States Patent and Trademark Office*